United States Patent [19]

Messina

[11] Patent Number: 5,240,478
[45] Date of Patent: Aug. 31, 1993

[54] SELF-CONTAINED, PORTABLE ROOM AIR TREATMENT APPARATUS AND METHOD THEREFORE

[76] Inventor: Gary D. Messina, 476 Cedar Ave., West Long Branch, N.J. 07764

[21] Appl. No.: 905,105

[22] Filed: Jun. 26, 1992

[51] Int. Cl.⁵ .................. B01D 29/07; B01D 46/10
[52] U.S. Cl. .................................. 95/273; 55/279; 55/356; 55/471; 55/472; 55/502
[58] Field of Search .................. 55/97, 279, 316, 356, 55/467, 471, 472, 502

[56] References Cited

U.S. PATENT DOCUMENTS

| | | | |
|---|---|---|---|
| 1,958,768 | 5/1934 | Ross | 55/472 |
| 2,553,711 | 5/1951 | Jackson | 55/279 |
| 2,822,059 | 2/1958 | Lunn et al. | 55/487 |
| 2,945,554 | 7/1960 | Berly | 55/279 |
| 3,308,610 | 3/1967 | Springer et al. | 55/471 |
| 3,336,855 | 8/1967 | Messina | 454/60 |
| 3,375,640 | 4/1968 | Pelosi, Jr. | 55/276 |
| 3,426,512 | 2/1969 | Nesher | 55/467 X |
| 3,486,308 | 12/1969 | Burt | 55/279 X |
| 3,616,624 | 11/1971 | Marsh | 55/472 |
| 3,719,028 | 3/1973 | Brooks | 55/85 |
| 3,724,172 | 4/1973 | Wood | 55/97 |
| 3,827,862 | 8/1974 | Berlant | 55/279 X |
| 4,210,429 | 7/1980 | Golstein | 55/279 |
| 4,236,902 | 12/1980 | Fricke | 55/279 |
| 4,272,261 | 6/1981 | Lynch, Jr. et al. | 55/279 |
| 4,333,745 | 6/1982 | Zeanwick | 55/97 |
| 4,361,427 | 11/1982 | Barradas | 55/279 |
| 4,370,155 | 1/1983 | Armbruster | 55/316 |
| 4,377,399 | 3/1983 | Bryson | 55/472 X |
| 4,378,983 | 4/1983 | Martin | 55/357 |
| 4,531,956 | 7/1985 | Howorth | 55/279 |
| 4,629,482 | 12/1986 | Davis | 55/471 X |
| 4,726,825 | 2/1988 | Natale | 55/318 |
| 4,737,173 | 4/1988 | Kudirka et al. | 55/276 |
| 4,750,924 | 6/1988 | Potter | 55/472 |
| 4,767,427 | 8/1988 | Barabas et al. | 55/493 |
| 4,778,496 | 10/1988 | Conrad | 55/356 X |
| 4,787,922 | 11/1988 | Kulitz | 55/274 |
| 4,810,269 | 3/1989 | Stackhouse et al. | 55/356 X |
| 4,838,910 | 6/1989 | Stollenwerk et al. | 55/385.2 |
| 4,857,189 | 8/1989 | Thomsen et al. | 210/232 |
| 4,900,344 | 2/1990 | Lansing | 55/322 |
| 4,904,382 | 2/1990 | Thomsen | 210/236 |
| 4,929,263 | 5/1990 | Kasugai | 55/502 |
| 4,963,170 | 10/1990 | Weber et al. | 55/311 |
| 4,990,313 | 2/1991 | Pacosz | 422/121 |
| 5,057,127 | 10/1991 | Lange et al. | 55/97 |
| 5,064,453 | 11/1991 | Jacquish | 55/217 |
| 5,102,435 | 4/1992 | Rau et al. | 55/467 |
| 5,139,546 | 8/1992 | Novobilski | 55/316 |
| 5,141,706 | 8/1992 | Clark | 55/316 X |

FOREIGN PATENT DOCUMENTS 1-168315  7/1989  Japan ............... 55/467

*Primary Examiner*—Robert Spitzer
*Attorney, Agent, or Firm*—Lerner, David, Littenberg, Krumholz & Mentlik

[57] ABSTRACT

A self-contained, portable air purification device is designed to continuously cleanse airborne particulates which include infectious respiratory organisms such as tuberculosis bacilla. Contaminated air is drawn into the device about 360° from the breathing or working zone to capture the airborne infectious respiratory organisms. The airborne microbial particulates are extracted by a high efficiency particulate air filter capable of eliminating 99.97% of all airborne particles that are 0.3 microns in size or larger. The filter is permanently sealed within a filter cube that is disposable in its entirety for replacement purposes. The filter cube is releasably secured within the device to provide a leak-free air tight seal eliminating any potential air bypass. Clean filtered air is discharged at the bottom of the device in a 360° circumference to create a recirculating flow pattern that effectively eliminates airborne particulate while diluting the air within the room with clean filtered air on a continuous basis. The device is designed to operate at various capacity levels depending upon the size of the room to be treated. When adjusted to its mid range operating level, the device will provide the average size room with more than five times the air changes as recommended by the Center for Disease Control.

33 Claims, 4 Drawing Sheets

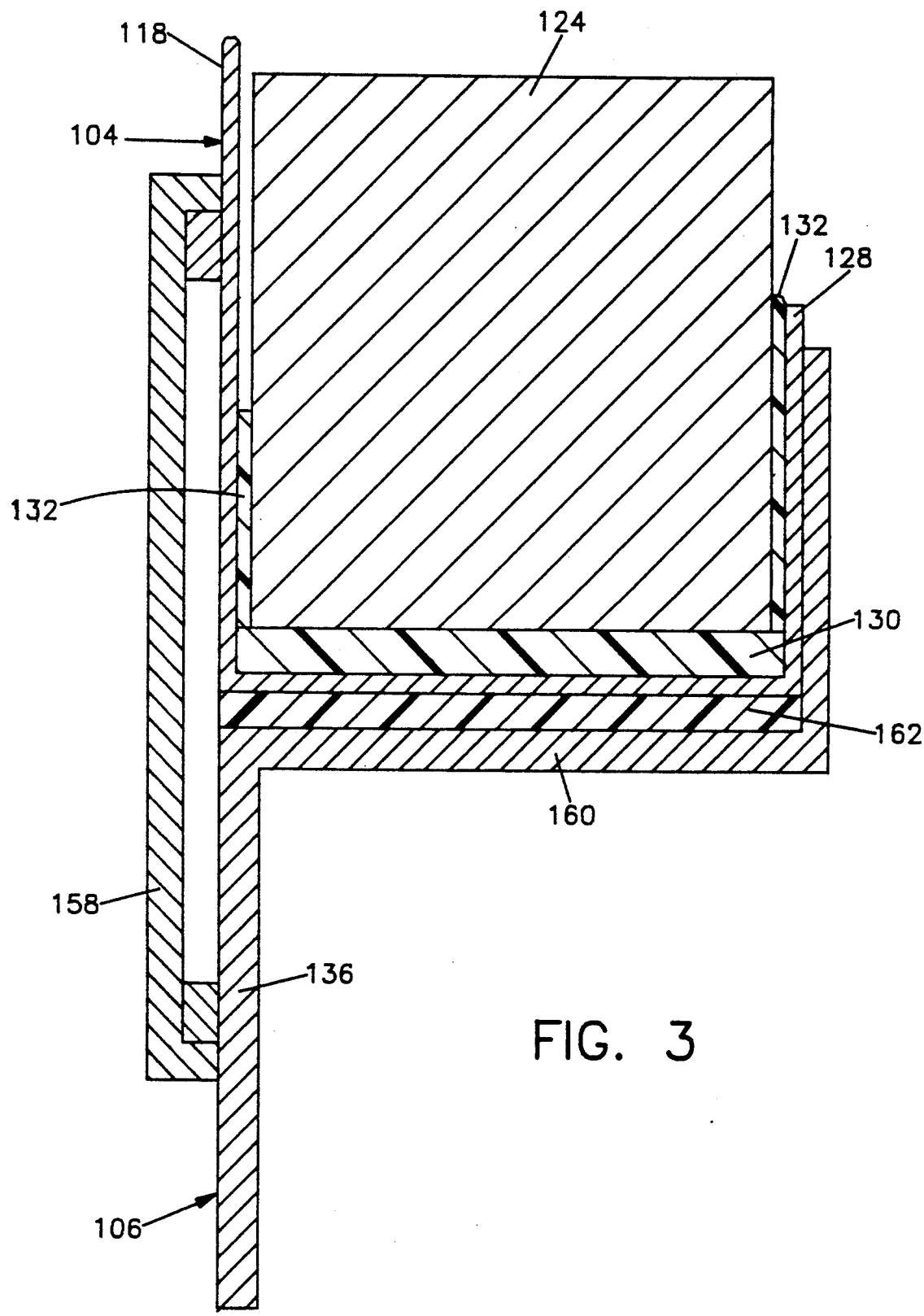

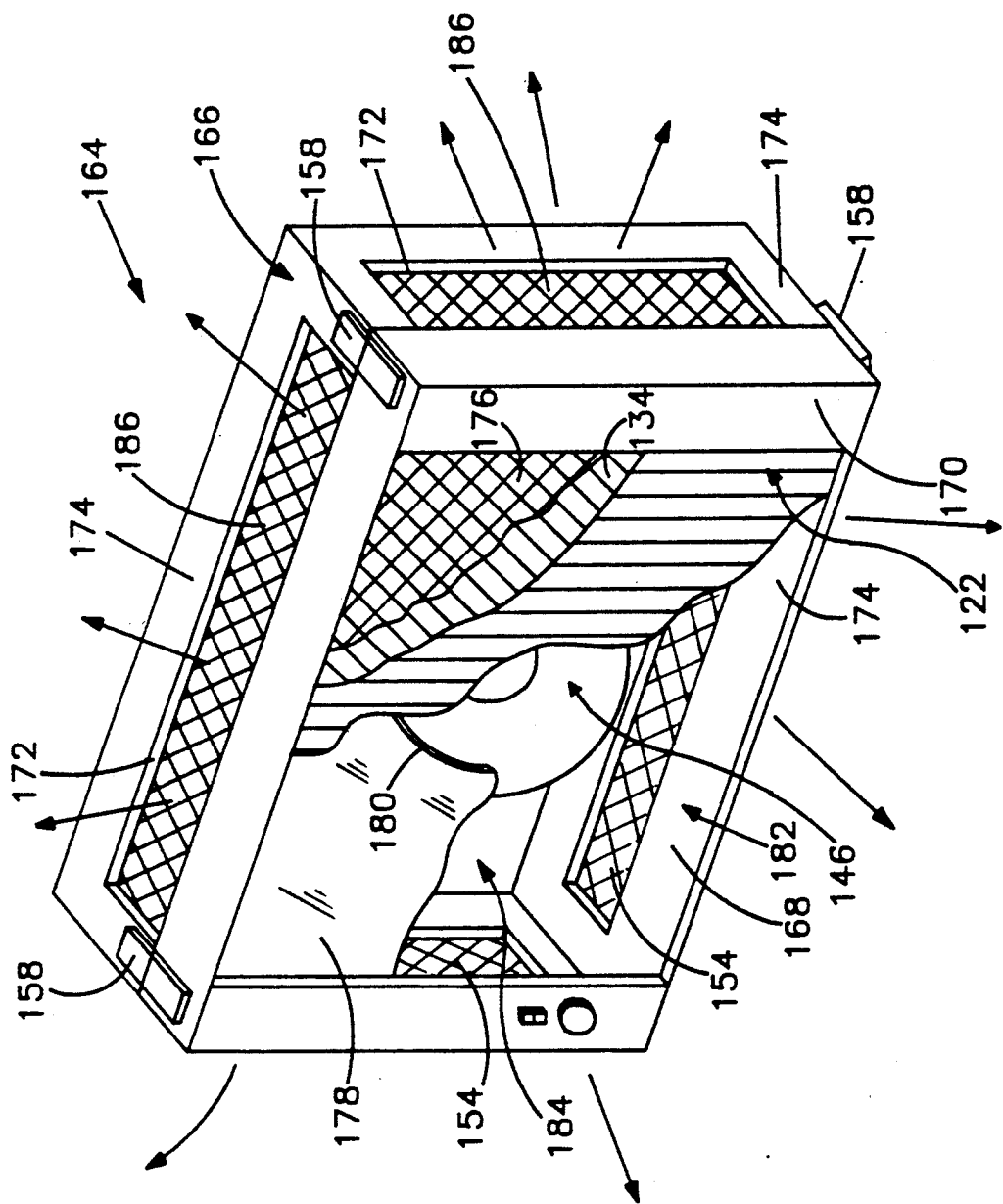

SELF-CONTAINED, PORTABLE ROOM AIR TREATMENT APPARATUS AND METHOD THEREFORE

BACKGROUND OF THE INVENTION

The present invention relates in general to a portable air purification device for closed environments containing polluted air, and more particularly, to a high capacity mobile air purifier which is designed to address the problems and concerns of patients and health care personnel in environments where communicable diseases can be transmitted via the airborne route.

Air purification devices have been widely used in various applications from pollen and smoke containing polluted air at work places and the like, to hazardous microbial airborne particles which include the tuberculosis bacilla and other infectious respiratory organisms at hospitals and the like. Tuberculosis, in particular, has become a nationwide dilemma. Recent outbreaks of new drug resistant strains have surfaced in many locations. For example, last year New York State had a 31% increase in active cases, while New York City has experienced more than a doubling of their tuberculosis cases in the last decade. It is estimated that one million persons are infected with HIV which is a contributing factor to the current tuberculosis epidemic. Recent reports state that some ten million Americans are currently infected with tuberculosis.

The Center for Disease Control in Atlanta, Ga. recommends the containment of airborne tuberculosis bacteria by the use of High Efficiency Particulate Air (HEPA) filtration, ventilation or exhaust, dilution, ultraviolet lamps or isolation rooms. Each of these recommended procedures, in and of themselves, suffer from a number of drawbacks. For example, HEPA filtration is very costly and can only be provided by placing HEPA filters in the existing ventilation system which may not serve the infected area. Most hospitals were not designed to accommodate the HEPA filters required for the current infectious epidemics. The hospitals ventilation systems frequently cannot be retrofitted to accommodate HEPA filters since they are must larger, heavier and have a much higher resistance than current filters being used.

Ventilation requires exhausting 100% of the contaminated air to the surrounding atmosphere and replacing same with make-up air which has to be filtered and either cooled or heated. Due to the large volume of air required to be exhausted, it is frequently both noisy and uncomfortable for the patient. In addition, it is improper to exhaust contaminated air within 25 feet of air intakes and within range of other humans or animals.

Dilution, on the other hand, requires that the contaminated air within a room be mixed with other air that is either filtered or is made up of outside air. In many areas of the country, the outside air is more severely polluted than the inside air and must be prefiltered prior to being introduced to the indoor environment. Dilution although effective in reducing the percentage of airborne tuberculosis bacteria is not 100% effective. In this regard, a sufficiently high level of tuberculosis bacteria will remain present which can infect a human present within the room.

The use of ultraviolet lamps or ultraviolet radiation has been recognized and utilized for many years in health care environments. However, unless there is a constant air flow within a room over the ultraviolet lamps, vast areas of the room are not disinfected. In addition, the further away one gets from the ultraviolet lamps, the lower the disinfection rate, as well as there being stagnant areas within the room which will be effectively untreated. It is also known that the ultraviolet lamps have to be shielded from patients who cannot be directly exposed to the light, as it affects both ones eyes and skin. These, as well as other drawbacks make the use of ultraviolet lamps or ultraviolet radiation ineffective as a sole procedure for controlling tuberculosis bacteria.

Isolation or negative pressure rooms have been found to be the best defense since they restrict the patient and contamination from spreading. However, most hospitals are not equipped with enough isolation rooms to accommodate the huge increase of patients being admitted. As any one of these procedures recommended by the Center for Disease Control possess individual drawbacks, there is an unsolved need for a self-contained portable room air treatment apparatus for the effective removal of hazardous microbial airborne particles to provide a safe environment for patients and medical staff.

SUMMARY OF THE INVENTION

One object of the present invention is to provide an air treatment apparatus in the nature of a self-contained air disinfection unit equipped with a disposable HEPA filter. The present invention is therefore designed to remove hazardous microbial airborne particulates down to 0.3 microns in size at the source, while continuously disinfecting and diluting the surrounding environment as the infectious droplet nuclei is randomly dispersed throughout the room.

Another object of the present invention is to provide an air treatment apparatus which is totally portable by allowing it to be placed wherever it is required, remaining as long as needed and reused again in another location if necessary. The present invention therefore provides the desirable flexibility in planning patient load and virtually makes any room or area accommodatable to specific patient requirements.

Another object of the present invention is to provide an air treatment apparatus which utilizes the various recommended practices outlined by the Center for Disease Control. The present invention ventilates the room by continuously recirculating the air within it. As the contaminated air is passed through the apparatus, it is continuously cleaned of airborne particulates which include the tuberculosis bacilla and/or other infectious respiratory organisms thereby diluting the remaining air upon exhaust. The present invention thereby provides for continual air changes within the room while maintaining a healthy environment.

Another object of the present invention is to provide an air treatment apparatus which is designed to accommodate ultraviolet lamps in a plenum chamber downstream of the HEPA filter. The HEPA filter will completely prevent all tuberculosis bacilla from passing through, since the bacteria is larger than the filter's minimum efficiency, while the ultraviolet lamps can be used as an additional safeguard.

Another object of the present invention is to provide an air treatment apparatus which may be used in patient rooms, as well as other areas considered just as critical and vulnerable to the presence of infectious respiratory organisms. In this regard, prior to hospital admittance, waiting rooms and emergency rooms often contain groups of individuals yet to be diagnosed who may contain infectious diseases such as tuberculosis and the like. Placement of the air treatment apparatus of the present invention in these areas will greatly affect the air quality breathed by those unsuspecting patients, occupants and heath care workers who would be potentially at risk.

In accordance with one embodiment of the present invention, there is disclosed a self-contained room air treatment apparatus comprising contaminated air inlet means arranged at a first elevation for drawing contaminated air flow thereinto, an air filter assembly arranged adjacent the air inlet means in air flow communications therewith, clean air outlet means arranged at a second elevation below the first elevation in air flow communications with the air filter assembly for discharging clean air flow therefrom, and blower means arranged between the air filter assembly and the air outlet means for drawing contaminated air at the first elevation through the air inlet means and the air filter assembly and discharging clean air radially through the air outlet means at the second elevation.

In accordance with another embodiment of the present invention, there is disclosed a self-contained, portable room air treatment apparatus comprising contaminated air inlet means for drawing contaminated air flow thereinto, a disposable air filter assembly releasably secured at one end thereof to the air inlet means in air flow communications therewith, the air filter assembly comprising an outer housing providing a filter chamber and an air filter permanently sealed to the outer housing within the filter chamber, a blower unit releasably secured to the air filter assembly at the other end thereof in air flow communications therewith, the blower unit including clean air outlet means for discharging clean air flow therefrom and blower means for drawing contaminated air through the air inlet means and the air filter and discharging clean air through the air outlet means, the air filter assembly replaceable as an integral unit by another one of the air filter assemblies upon detachment from the air inlet means and the blower unit.

In accordance with another embodiment of the present invention, there is disclosed a self-contained, portable room air treatment apparatus comprising contaminated air inlet means arranged at a first elevation for drawing contaminated air flow radially thereinto, a disposable air filter assembly releasably secured at one end thereof to the air inlet means in air flow communications therewith, the air filter assembly comprising an outer housing providing a filter chamber and an air filter within the filter chamber permanently sealed to the outer housing, and a blower unit releasably secured to the air filter assembly at the other end thereof in air flow communications therewith, the blower unit including clean air outlet means arranged at a second elevation below the first elevation for discharging clean air flow radially therefrom and blower means arranged between the air filter assembly and the air outlet means for drawing contaminated air at the first elevation through the air inlet means and the air filter and discharging clean air radially through the air outlet means at the second elevation, the air filter assembly replaceable as an integral unit by another one of the air filter assemblies upon detachment from the air inlet means and the blower unit.

In accordance with another embodiment of the present invention, there is disclosed a method for the treatment of contaminated air using a self-contained room air treatment apparatus, the method comprising drawing contaminated air flow at a first elevation from the surrounding environment into the apparatus, filtering contaminating matter from the contaminated air flow to provide clean filtered air, and discharging the clean filtered air from the apparatus into the surrounding environment at a second elevation below the first elevation.

BRIEF DESCRIPTION OF THE DRAWINGS

The above description, as well as further objects, features and advantages of the present invention will be more fully understood with reference to the following detailed description of a self-contained portable room air treatment apparatus and method therefore, when taken in conjunction with the accompanying drawings, wherein:

FIG. 3 is an enlarged view of that portion of FIG. 1 within the designated circle, showing the internal permanent seal of the HEPA filter within its housing and releasably sealing same to a blower unit; and FIG. 4 is a perspective view of a wall mounted self-contained room air treatment apparatus constructed in accordance with another embodiment of the present invention.

DETAILED DESCRIPTION OF THE PREFERRED EMBODIMENT

Figure 1:
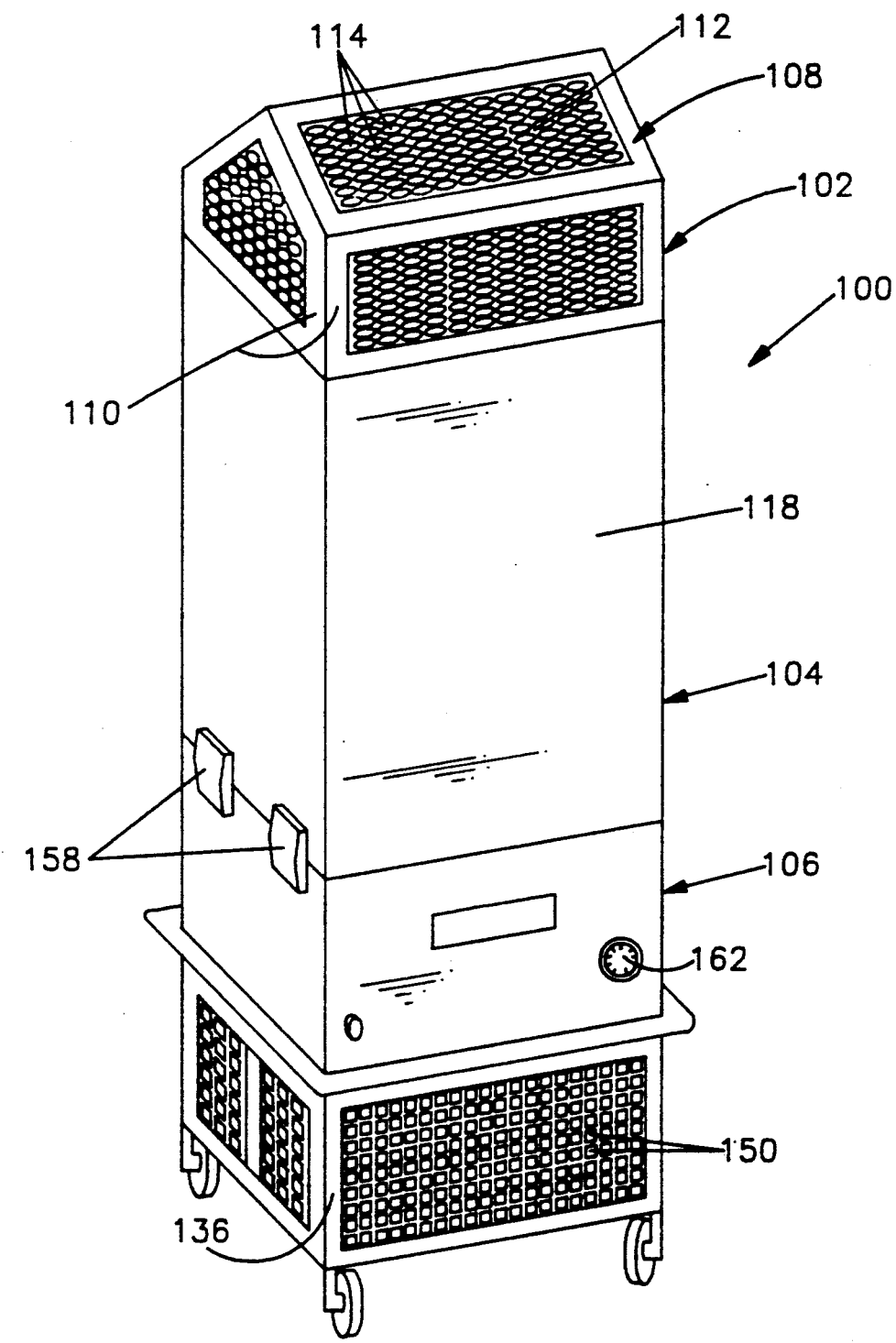
FIG. 1 is a perspective view of a self-contained, portable room air treatment apparatus constructed in accordance with the present invention.

Referring now to the drawings wherein like reference numerals represent like elements, there is disclosed in FIG. 1 a self-contained, portable room air treatment apparatus designated generally by reference numeral 100 . The apparatus 100 is generally constructed of three modular components, namely, air inlet cap 102, air filter assembly 104 and blower unit 106. Each of these components are releasably secured to one another in a vertically stacked relationship as to be described hereinafter to provide the apparatus 100 with a certain degree of modularity.

Figure 2:
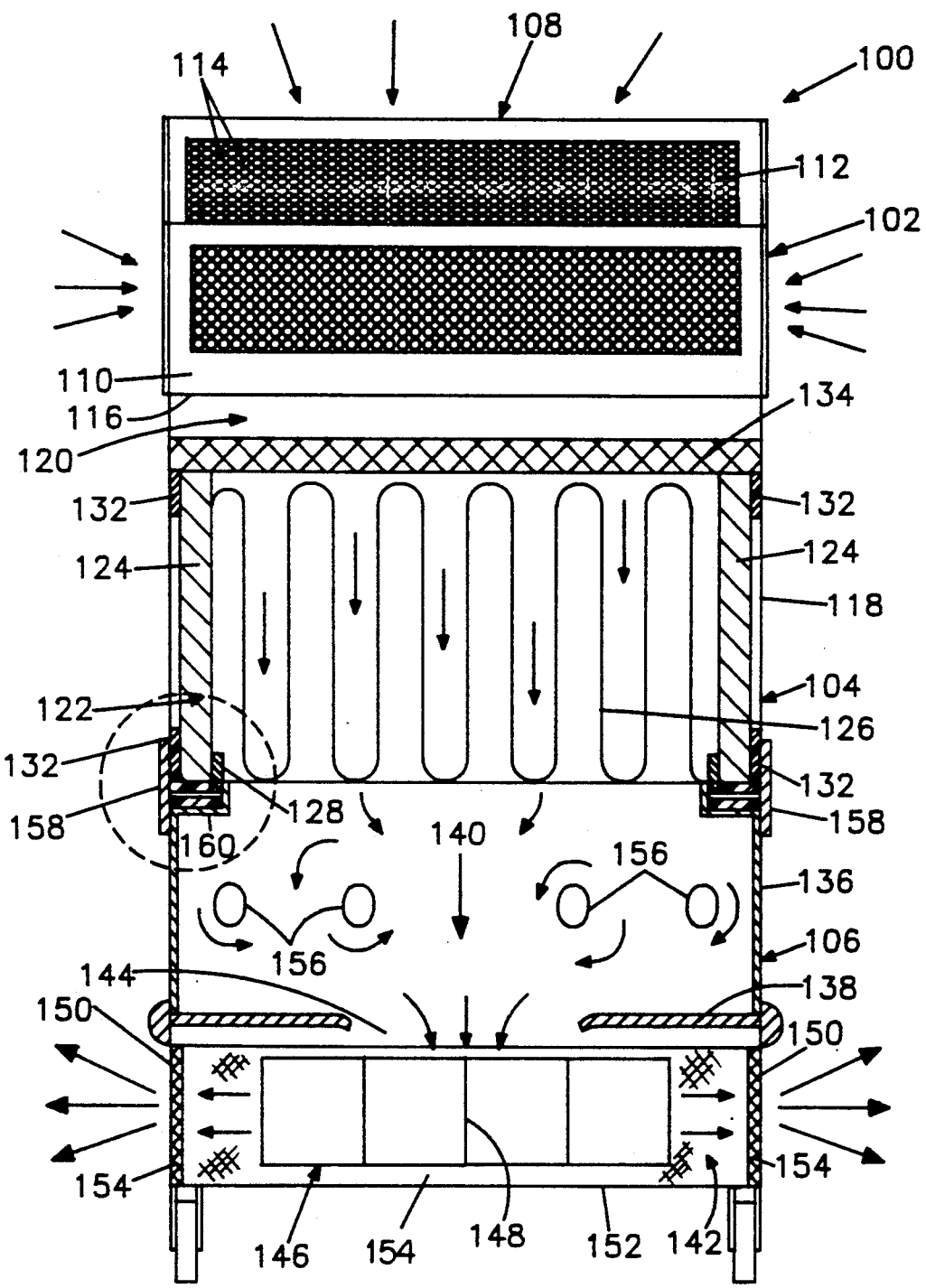
FIG. 2 is a cross-sectional view taken along line 2—2 in FIG. 1, showing the construction of the air treatment apparatus in accordance with one embodiment of the present invention.

Referring to FIGS. 1 and 2, the inlet cap 102 is constructed as a housing 108 having four surrounding vertical side walls 110 and two inclined roof walls 112. The roof walls 112 are inclined to prevent the use of the inlet cap 102 for the placement of liquid containers such as drinking cups which might leak into the apparatus 100. Each of the walls 110,112 are provided with a plurality of holes 114 which enables the drawing of contaminated air flow into the apparatus 100 radially about 360° through side walls 110, as well as axially through roof walls 112.

The inlet cap 102 is provided with a large rectangular opening 116 opposing the roof walls 112 adapted to receive one end of the air filter assembly 104 and securing same thereto by means of, for example, screws and the like. The inlet cap 102 accordingly functions as an air inlet for withdrawing contaminated air flow containing infectious respiratory organisms or particulate matter such as smoke, pollen, lint and the like into the apparatus 100 for treatment.

The air filter assembly 104 is constructed from a rectangular outer housing 118 open at both ends which provides a central filter chamber 120. Received within the filter chamber 120 is a HEPA filter 122. HEPA type filters have been widely utilized in the medical, health care and pharmaceutical fields as a means to entrap airborne particulates in the submicron range. This type of filter is widely recognized and has been specified in federal, military and pharmaceutical standards for more than 30 years.

The HEPA filter 122 is constructed of extremely large concentrations of randomly oriented boron silicate fibers. This filtration media consists of 100% glass microfibers which range in mean diameters from 0.26–7 microns in size. Acrylic resin binders bond the various controlled blends of several glass fiber diameters to create a mat and matrix composed of numerous passages. The smaller the fiber diameter, the greater the capture and containment of smaller particles and the higher the efficiency of the filter. The HEPA filter 122 is capable of a minimum efficiency of 99.97% on 0.3 micron size particles, which provides the highest degree of filtration in environments where airborne bacterial concentrations pose a hazard to patients, health care workers and the like. In addition, the HEPA filter 122 is capable of removing other airborne contaminants such as dust, pollen, mold spores and the like. The HEPA filter 122 is available commercially from HEFCO of Lancaster, Pa. under the Trademark ULTRAFLOW having a 1100 CFM capacity.

The HEPA filter 122 may be treated with an anti-microbial solution which kills bacteria on contact. One such anti-microbial solution suitable for this purpose is available from Aegis Environmental Management, Inc. of Milford, Ohio.

The HEPA filter 122 includes its own inner housing 124 containing filter material 126. The inner housing 124 of the HEPA filter 122 is permanently sealed to the outer housing 118 within the filter chamber 120 to prevent bypass of contaminated air flow through the air filter assembly 104. In this regard, outer housing 118 at its lower end, see FIG. 3, is formed with a circumscribing inwardly facing L-shaped flange 128. The flange 128 forms a continuous channel which receives a resilient gasket 130 of Neoprene, silicon or other such suitable materials which is compressed by the end of the inner housing 124. The inner housing 124 of the HEPA filter 122 is permanently sealed to the outer housing 118 using sealant material 132, such as silicon sealant material. The sealant material 132 is generously spread circumferentially about either end of the inner housing 124 so as to adhere to the inside surface of the outer housing 118 creating a permanent air tight seal thereat.

The permanent sealing of the HEPA filter 122 within the air filter assembly 104 renders the assembly nonservicable and designed to be entirely replaceable as an integral pre-sealed modular unit. In this regard, the entire air filter assembly 104, including outer and inner housings 118, 124 and filter material 126 is disposed of when replacement is required. This eliminates the need for a specially trained and certified individual as would be required to install the HEPA filter 122 in a sealed air tight manner within the filter assembly 104. As such, when the HEPA filter 122 needs replacement, the entire air filter assembly 104 is replaced and the old assembly disposed of. To facilitate disposal, the outer and inner housings 118, 124 of the air filter assembly 104 may be constructed of combustible material, as well as the majority of the components of the HEPA filter itself, to enable burning for easy disposal.

As an option, a low efficiency pre-filter 134 may be positioned overlying the HEPA filter 122 within the open end of the outer housing 118 underlying the air inlet cap 102. The pre-filter 134 may have a particle retention size in the range of 10–15 microns or larger for trapping conventional airborne particles such as lint, dust, pollen and the like. In addition, the prefilter 134 may also include a charcoal layer for treatment of odors, fumes or other noxious vapors which may be present in the incoming air flow. The pre-filter 134 dependent upon usage, is expected to be replaced substantially more frequently than required for the HEPA filter 122.

One distinct advantage of the design of the air filter assembly 104 is its ability to utilize various types and efficiencies of filters as required by the particular application, such as HEPA filters 122. Depending upon the criticality of the application, lower efficiency filters may be utilized for other purposes, such as for oil mist, lint, dust, pollen and the like.

The air filter assembly 104 is releasably secured to the blower unit 106. The blower unit 106 includes a housing 136 having an interior divider plate 138 which separates the housing into an upper chamber 140 and a lower chamber 142. The divider plate 138 is provided with an enlarged central opening 144 to provide air flow communication between the upper and lower chambers 140, 142.

A motor/impeller unit 146 having a backward curved motorized impeller 148 is positioned within the lower chamber 142 underlying the opening 144 in the divider plate 138. The motor/impeller unit 146 draws air flow axially through opening 144 within the divider plate 138 and discharges same radially outward about 360° as illustrated by the arrows. A motor/impeller unit 146 suitable for use in the apparatus 100 is available from ebm Industries, Inc. of Farmington, Conn. having a capacity of 1200 CFM.

The lower half of housing 136 surrounding the lower chamber 142 is provided with a plurality of side holes 150 which accommodates the 360° radial discharge of air flow from the apparatus 100 by means of the motor/impeller unit 146. The bottom wall 152 of the blower unit 106 is also provided with a plurality of holes (not shown) which function as an exhaust overflow, i.e., safety feature, in the event the side holes 150 should become blocked. Overlying the side holes 150 is a lower efficiency post filter 154, e.g., 20 pores per inch, of polyester or other suitable material which helps to diffuse the discharge clean air stream from the motor/impeller unit 146. In addition, the post-filter 154 may be impregnated with charcoal to absorb odors, fumes or other vapors as may be desired.

Optionally, a plurality of cold cathode germicidal ultraviolet lamps each rated at 25 lamp watts, 5.0 ultraviolet output watts may be installed within the upper chamber 140 of the blower unit 106. The ultraviolet lamps 156 being positioned downstream of the HEPA filter 122 prevents the need for the periodic maintenance and cleaning of the lamps since no particles larger than 0.3 microns will pass through the HEPA filter. Since the ultraviolet lamps 156 are totally enclosed, individuals are shielded and afforded protection from exposure to the ultraviolet radiation. The ultraviolet lamps 156 are effective for their germicidal ultraviolet radiation in killing airborne bacteria such as the tuberculosis bacteria. The ultraviolet lamps 156 provide a degree of redundancy as the tuberculosis bacteria will not pass through the HEPA filter 122.

The blower unit 106 is releasably secured to the air filter assembly 104 by means of four drawdown latches 158 positioned in pairs on opposite sides of the apparatus 100. To achieve an air tight seal the upper end of housing 136 forming the blower unit 106 is provided with a circumscribing inwardly directed L-shaped flange 160. The flange 160 supports a circumscribing gasket 162 of Neoprene, silicon or other such suitable material. The L-shaped flange 128 on the air filter assembly 104 is supported on the gasket 162 to provide an effective leak-free, air tight seal upon clamping of the drawdown latches 158 thereby eliminating any potential air bypass or leakage.

The apparatus 100 is specially designed for health and medical facilities, and specifically for the elimination of airborne tuberculosis bacteria. By placing the apparatus 100 in a room, it draws in a high volume of air flow through the inlet cap 102 about 360° from the breathing or working zone. The apparatus 100 is designed to position the inlet cap 102 at the appropriate height for anyone standing, sitting or lying in a bed. This is known as source capture, as tuberculosis bacteria is expelled into the air by someone who is infected and who coughs.

The tuberculosis bacteria being between 1-5 microns in size, floats in the air until someone breathes in the bacillus and may thereby become infected. The tuberculosis bacteria can remain airborne almost indefinitely due to its size and near weightlessness. By creating air currents and air circulation within the room by means of the apparatus 100, one can be assured that the tuberculosis bacteria will be contained. The HEPA filter 122 will quickly filter out the tuberculosis bacteria as it effectively stops submicron particles. In addition, when the tuberculosis bacteria comes in contact with the filter surface, it will naturally die or will be killed upon contact with the optionally provided anti-microbial solution.

Exhausting the clean filtered air at floor level produces a 360° pattern which dilutes existing air and mixes with remaining air in the room. By constantly drawing contaminated air in and exhausting clean air within the room, depending upon size, one can change the air numerous times providing a cleaner, safer and healthier environment for patient and health workers alike. In this regard, the apparatus 100 in accordance with one embodiment is designed to have a maximum operating capacity of 725 CFM. When operating the apparatus at approximately half its rated capacity, it will provide for a standard 10'×10'×8' room, approximately 30 changes of air per hour. It is significant to note that the hospital only specifies six complete air changes per hour as recommended by the Center for Disease Control Guidelines.

The apparatus 100 offers HEPA filtration without the need for special housings or the upgrading of fans and blowers in existing hospital and other such facilities. The apparatus 100 can be wheeled anywhere it is required, without requiring any special ability to change and maintain the efficiency of the filtration process. Since the HEPA filter 122 is removing essentially all particulates from the air, including mold, pollen, dust and other bacteria, the apparatus 100 continuously provides a cleaner and safer environment for the patient.

When it is time to replace the HEPA filter 122, it is simply replaced as a unit by disposing of the used air filter assembly 104 in its entirety and reinstalling a replacement air filter assembly having a fresh HEPA filter 102 which has been permanently sealed therein. As such, there is no need to use the services of a highly skilled technician for replacement of the HEPA filter 122 when needed.

The operation of the apparatus 100 is monitored by a pressure differential gauge 162. The gauge 162 monitors the difference between the pressure upstream of the HEPA filter 122 and the surrounding atmosphere. When the pressure differential exceeds a predetermined value, this signifies time to replace the HEPA filter 122.

Referring now to FIG. 4, there is disclosed another embodiment of the present invention in the nature of a wall mounted self-contained air treatment apparatus 164. The wall mounted apparatus 164 includes a separable housing 166 including a contaminated air inlet opening 168 in front wall 170 and discharge openings 172 in the surrounding side walls 174 for discharging clean filtered air about 360°. An inlet grill 176 is secured within the inlet opening 168 and supports a pre-filter 134.

The housing 166 is internally divided by a plenum plate 178 having a central opening 180 to provide fluid communication between a forward chamber 182 and a rear chamber 184. Received within the forward chamber 182 between the pre-filter 134 and plenum plate 178 is a HEPA filter 122. The HEPA filter 122 may optionally be permanently sealed in its own outer housing (not shown) as previously described with respect to apparatus 100. In either event, the HEPA filter 122 is sealed at its forward and rear surfaces within housing 166 by suitable gaskets (not shown). The sealing may be achieved by the use of drawdown latches 158 of the type previously described with respect to the apparatus 100 which are provided on the separable housing 166. Replacement of the HEPA filter 122 is achieved as previously described, i.e., by placing same within the housing 166 and securing same using the drawdown latches 158. This provides a leak-free air tight seal eliminating any potential air bypass.

A motor/impeller unit 146 is positioned within the rear chamber 184 underlying opening 180 within the plenum plate 178. The motor/impeller unit 146 withdraws air axially through the HEPA filter 122 via the inlet grill 176 and pre-filter 134, discharging same radially outward through the discharge openings 172 about 360°. A grill 186 is secured within each of the discharge openings 172 overlying a post-filter 154. The housing 166 may be mounted to the wall of a room to be treated by suitable means. The wall mounted apparatus 164 operates in the manner as previously described with respect to apparatus 100.

Although the invention herein has been described with references to particular embodiments, it is to be understood that these embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A method for the treatment of contaminated air using a self-contained room air treatment apparatus, said method comprising drawing contaminated air flow at a first elevation from the surrounding environment into a first housing within said apparatus, filtering contaminating matter from said contaminated air flow by drawing contaminated air flow through an air filter assembly containing an air filter to provide clean filtered air, discharging said clean filtered air from a second housing within said apparatus into said surrounding environment at a second elevation below said first elevation, said air filter assembly being releasably secured to aid first and second housings, and periodically replacing said air filter assembly containing said air filter as an integral unit by another one of said air filter assembly upon detaching from said first and second housings.

2. The method of claim 1, comprising drawing contaminated air flow from the surrounding environment radially about 360°.

3. The method claim of 2, comprising discharging clean filtered air into said surrounding environment radially about 360°.

4. The method of claim 2, comprising discharging clean filtered air into said surrounding environment at said second elevation adjacent a surface supporting said apparatus in the environment to be treated.

5. A self-contained room air treatment apparatus comprising a first housing having contaminated air inlet means arranged at a first elevation for drawing contaminated air flow thereinto, an air filter assembly secured at one end thereof to said first housing in air flow communications with said air inlet means, an air filter secured within said air filter assembly, a second housing having clean air outlet means arranged at a second elevation below said first elevation in air flow communications with said air filter assembly for discharging clean air flow radially therefrom, said air filter assembly releasably secured at another end thereof to said second housing, and blower means within said second housing arranged between said air filter and said air outlet means for drawing contaminated air at said first elevation through said air inlet means and said air filter assembly and discharging clean air radially through aid air outlet means at said second elevation, said air filter being replaceable along with said air filter assembly as a unit upon detaching said air filter assembly at least from said second housing.

6. The apparatus of claim 1, wherein said air inlet means includes a plurality of openings for drawing contaminated air flow radially thereinto about 360°, and said air outlet means includes a plurality of openings for discharging clean air flow radially therefrom about 360°.

7. The apparatus of claim 7, wherein said air filter assembly comprises an outer housing providing a filter chamber and said air filter contained within an inner housing, said inner housing permanently sealed within said filter chamber to said outer housing.

8. The apparatus of claim 7, wherein said outer housing includes an L-shaped flange circumscribing one end thereof for receiving one end of said inner housing in sealed relationship.

9. The apparatus of claim 8, wherein said blower means includes said second housing having an L-shaped flange circumscribing one end thereof for receiving said L-shaped flange of said outer housing of said air filter assembly in sealed relationship.

10. The apparatus of claim 7, wherein said outer housing and said inner housing are constructed of combustible material.

11. The apparatus of claim 5, wherein said blower means includes said second housing divided into an upper chamber and a lower chamber in air flow communications therewith, and impeller means within said lower chamber for drawing contaminated air through said air inlet means and discharging clean air radially through said air outlet means.

12. The apparatus of claim 11, wherein said air outlet means includes a plurality of openings within said second housing arranged 360° about said impeller means.

13. The apparatus of claim 11, further including a plurality of ultraviolet lamps within said upper chamber underlying said air filter assembly.

14. The apparatus of claim 5, wherein said air filter is replaceable with said air filter assembly as an integral unit by another one of said air filter assembly.

15. The apparatus of claim 5, wherein said air filter assembly is releasably secured to said first housing for detachment therefrom upon replacement of said air filter assembly.

16. The apparatus of claim 5, wherein said first housing comprises a cap having a plurality of openings releasably secured to said air filter assembly.

17. A self-contained, portable room air treatment apparatus comprising contaminated air inlet means for drawing contaminated air flow thereinto, a disposable air filter assembly releasably secured at one end thereof to said air inlet means in air flow communications therewith, said air filter assembly comprising an outer housing providing a filter chamber and an air filter permanently sealed to said outer housing within said filter chamber, a blower unit releasably secured to said air filter assembly at the other end thereof in air flow communications therewith, said blower unit including clean air outlet means for discharging clean air flow therefrom and blower means for drawing contaminated air through said air inlet means and said air filter and discharging clean air through said air outlet means, said air filter assembly replaceable as an integral unit by another one of said air filter assemblies upon detachment from said air inlet means and said blower unit.

18. The apparatus of claim 17, wherein said air inlet means includes a plurality of openings for drawing contaminated air flow radially thereinto about 360°, and said air outlet means includes a plurality of openings for discharging clean air flow radially therefrom about 360°.

19. The apparatus of claim 18, wherein said air inlet means includes an inclined roof wall having a plurality of openings for drawing contaminated air axially thereinto.

20. The apparatus of claim 17, wherein said air filter is contained within an inner housing, said inner housing permanently sealed to said outer housing within said filter chamber.

21. The apparatus of claim 20, wherein said outer housing includes an L-shaped flange circumscribing one end thereof for receiving one end of said inner housing in sealed relationship.

22. The apparatus of claim 21, wherein said blower means includes a housing having an L-shaped flange circumscribing one end thereof for receiving said L-shaped flange of said outer housing of said air filter assembly in sealed relationship.

23. The apparatus of claim 19, wherein said blower means includes a housing divided into an upper chamber and a lower chamber in air flow communications therewith, and impeller means within said lower chamber for drawing contaminated air through said air inlet means and discharging clean air radially through said air outlet means.

24. The apparatus of claim 23, wherein said air out means includes a plurality of openings within said housing arranged 360° about said impeller means.

25. The apparatus of claim 17, wherein said air in means, said air filter assembly and said blower unit are arranged in longitudinal alignment with each other.

26. A self-contained, portable room air treatment apparatus comprising contaminated air inlet means arranged at a first elevation for drawing contaminated air flow radially thereinto, a disposable air filter assembly releasably secured at one end thereof to said air inlet means in air flow communications therewith, said air filter assembly comprising an outer housing providing a filter chamber and an air filter within said filter chamber permanently sealed to said outer housing, and a blower unit releasably secured to said air filter assembly at the other end thereof in air flow communications therewith, said blower unit including clean air outlet means arranged at a second elevation below said first elevation for discharging clean air flow radially therefrom and blower means arranged between said air filter assembly and said air outlet means for drawing contaminated air at said first elevation through said air inlet means and said air filter and discharging clean air radially through said air outlet means at said second elevation, said air filter assembly replaceable as an integral unit by another one of said air filter assemblies upon detachment from said air inlet means and said blower unit.

27. The apparatus of claim 26, wherein said air filter includes an inner housing, therefor permanently sealed to said outer housing within said filter chamber.

28. The apparatus of claim 21, wherein said outer housing includes an L-shaped flange circumscribing one end thereof for receiving one end of said inner housing in sealed relationship.

29. The apparatus of claim 28, wherein said blower means includes a housing having an L-shaped flange circumscribing one end thereof for receiving said L-shaped flange of said outer housing of said air filter assembly in sealed relationship.

30. The apparatus of claim 26, wherein said air inlet means includes a plurality of openings for drawing contaminated air flow radially thereinto about 360°, and said air outlet means includes a plurality of openings for discharging clean air flow radially therefrom about 360°.

31. The apparatus of claim 26, wherein said blower means includes a housing divided into an upper chamber and a lower chamber in air flow communications therewith, and impeller means within said lower chamber for drawing contaminated air through said air inlet means and discharging clean air radially through said air outlet means.

32. The apparatus of claim 24, wherein said air outlet means includes a plurality of openings within said housing arranged 360° about said impeller means.

33. A self-contained room air treatment apparatus comprising a first housing having contaminated air inlet means arranged at a first elevation for drawing contaminated air flow thereinto and contaminated air flow outlet means for expelling contaminated air flow therefrom, an air filter assembly releasably secured at one end thereof to said outlet means of said first housing in air flow communications with said air inlet means, an air filter secured within said air filter assembly, a second housing having clean air inlet means and clean air outlet means arranged at a second elevation below said first elevation in air flow communications with said air filter assembly for discharging clean air flow radially therefrom, said air filter assembly releasably secured at another end thereof to said inlet means of said second housing, and blower means within said second housing arranged between said air filter and said air outlet means of said second housing for drawing contaminated air at said first elevation through said air inlet means of said first housing and said air filter assembly and discharging clean air radially through said air outlet means of said second housing at said second elevation, said air filter being replaceable as an integral unit along with said air filter assembly by another one of said air filter assemblies upon detaching said air filter assembly from said first and second housings.

* * * * *

UNITED STATES PATENT AND TRADEMARK OFFICE
CERTIFICATE OF CORRECTION

PATENT NO. : 5,240,478

DATED : August 31, 1993

INVENTOR(S) : Gary D. Messina

It is certified that error appears in the above-identified patent and that said Letters Patent is hereby corrected as shown below:

Column 9, line 10, "aid" should read --said--.
Column 9, line 41, "aid" should read --said--.
Column 9, line 52, "7" should read --5--.
Column 10, line 65, "19" should read --17--.
Column 11, line 7, "in" should read --inlet--.
Column 11, line 35, "21" should read --27--.

Signed and Sealed this

Twenty-second Day of March, 1994

Attest:

BRUCE LEHMAN

Attesting Officer     Commissioner of Patents and Trademarks